(12) United States Patent
Price

(10) Patent No.: US 6,659,079 B2
(45) Date of Patent: Dec. 9, 2003

(54) ENGINE IDLE SPEED CONTROL

(75) Inventor: Stuart Graham Price, Kensington (AU)

(73) Assignee: Orbital Engine Company (Australia) Pty Limited, Balcatta (AU)

(*) Notice: Subject to any disclaimer, the term of this patent is extended or adjusted under 35 U.S.C. 154(b) by 45 days.

(21) Appl. No.: 10/110,220
(22) PCT Filed: Dec. 20, 2000
(86) PCT No.: PCT/AU00/01566
§ 371 (c)(1), (2), (4) Date: Apr. 22, 2002
(87) PCT Pub. No.: WO01/48361
PCT Pub. Date: Jul. 5, 2001

(65) Prior Publication Data
US 2002/0152989 A1 Oct. 24, 2002

(30) Foreign Application Priority Data
Dec. 24, 1999 (AU) .............................................. PQ 4898

(51) Int. Cl.⁷ .......................... F02D 41/16; F02D 41/08
(52) U.S. Cl. .............................. 123/339.21; 123/339.19
(58) Field of Search ...................... 123/339.14, 339.19, 123/339.2, 339.21, 339.22, 339.23

(56) References Cited

U.S. PATENT DOCUMENTS

| 4,570,592 A | | 2/1986 | Otobe ................... 123/339.23 |
| 4,681,075 A | | 7/1987 | Yamato et al. ......... 123/339.22 |
| 4,700,674 A | | 10/1987 | Iwata .......................... 123/327 |
| 5,040,505 A | | 8/1991 | Toyoda ........................ 123/327 |
| 5,136,997 A | * | 8/1992 | Takahashi et al. ...... 123/339.21 |
| 6,164,265 A | * | 12/2000 | Yip et al. ............... 123/339.21 |

FOREIGN PATENT DOCUMENTS

DE  19534844 A1 * 3/1997 ........... F02D/41/16

* cited by examiner

Primary Examiner—Tony M. Argenbright
(74) Attorney, Agent, or Firm—Rothwell, Figg, Ernst & Manbeck

(57) ABSTRACT

A method of controlling the idle speed of an internal combustion engine including, in response to the engine speed being below a predetermined level: determining the rate of change of the speed of the engine; selecting an idle entry set-point as a function of said rate; and initiating idle speed control of the engine on the basis of said idle entry set-point to thereby control the engine speed to a base idle speed.

31 Claims, 2 Drawing Sheets

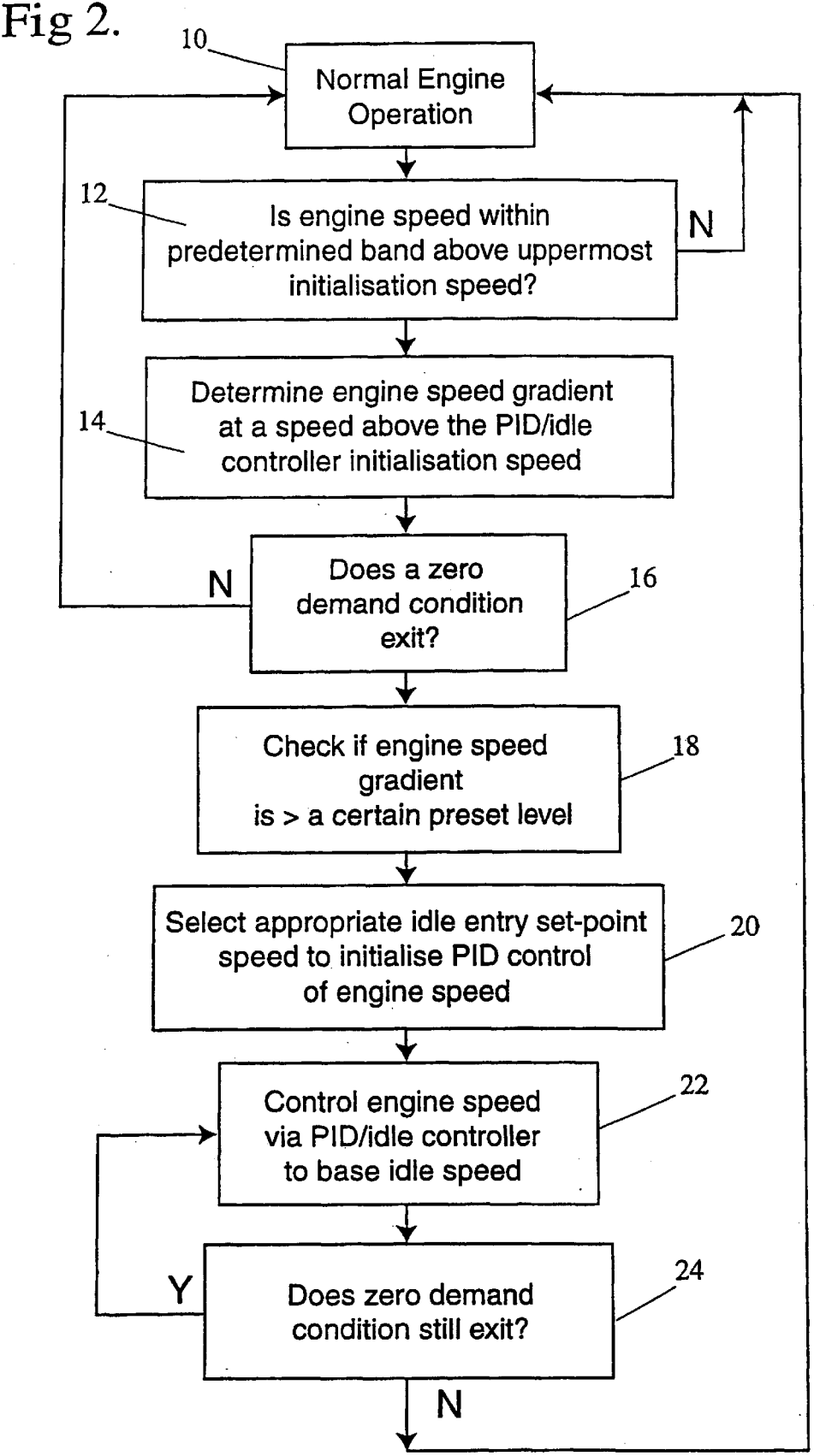

ENGINE IDLE SPEED CONTROL

Figure 1:
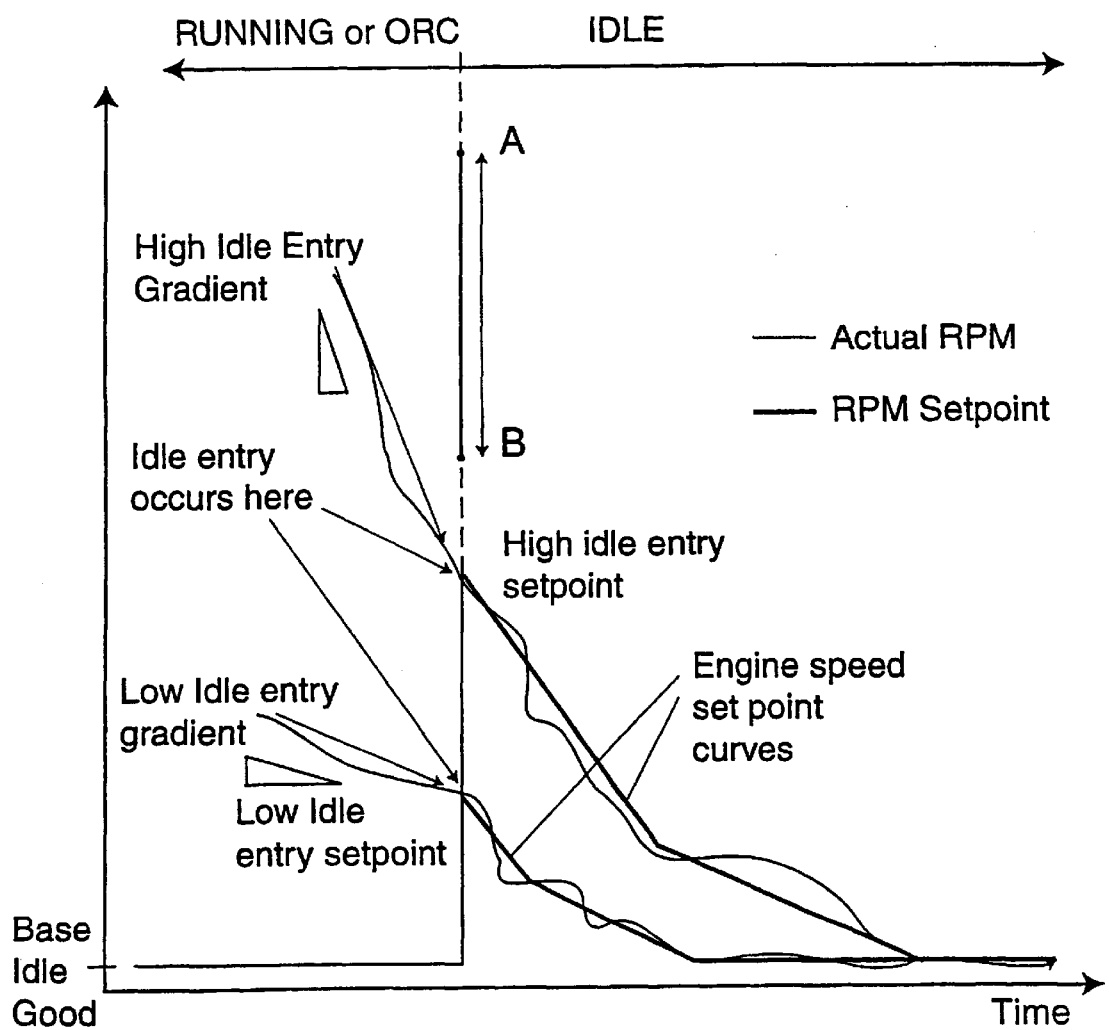

The present invention is generally directed to control strategies for internal combustion engines, and in particular to the control of the engine idle speed. Although the present invention will in the main be described in relation to engines having direct injected fuel injection systems, it is to be appreciated that the invention is also applicable on engines using alternative fuelling systems.

The Applicant has developed dual fluid direct injected fuel injection systems for use on both two and four stroke internal combustion engines. An example of such a dual fluid fuel injection system is described in the Applicant's U.S. Pat. No. 4,693,224, the contents of which are incorporated herein by reference. These fuel systems can be used in a wide variety of recreational, marine, automotive and aeronautical engine applications.

Such directed injected engines are typically controlled by varying the fuelling rate to the engine as a function of engine load and speed. When the engine is operating at idle, an idle controller including a Proportional Integral Differential (PID) system is typically used to return or maintain the operation of the engine at a predetermined base idle speed. The idle controller generally provides closed loop engine idle speed control by varying the fuelling rate to the engine so that the engine speed is maintained and returned to the base idle speed. When initially coming out of an off-idle mode of operation and into idle, the idle controller may achieve this by setting engine speed set-points which progressively ramp the engine speed down to the final base idle speed.

Operation of the idle controller is normally initiated when the engine speed drops below a predetermined level as it approaches idle. This predetermined level is known as the "idle entry set-point". Once the engine speed falls below this idle entry set-point speed, the idle controller then acts to reduce the engine speed by varying the fuelling rate to the engine to progressively bring the engine speed to the final base idle speed. The idle controller then maintains the engine speed at this steady state base idle speed while the engine is in its idle or no load state. Hence, the idle controller is typically initialised at a certain offset above the base idle speed and this is primarily done to ensure that a smooth transition from off-idle engine speeds to idle is possible.

It has been found for certain engine applications that it may not always be practical to use an idle speed control strategy wherein only a single idle entry set-point has been defined. This may particularly be the case in respect of vehicles having low inertia engines and/or a continuously variable transmission (CVT) such as, for example, scooters and all-terrain-vehicles (ATVs). In such vehicles, the CVT may not de-clutch from the engine at the same speed at which the clutch engages. Therefore, situations can arise whereby the engine can enter the idle control process with either the CVT engaged or disengaged. Hence, in one possible scenario, while the engine may be in an unloaded or "zero demand" state, the engine may still continue to be driven through the CVT. The result of this is that the rate of engine speed deceleration is lower than would normally be the case if the engine had been de-clutched. As a result, the engine speed may, for an extended period of time, be maintained at a significantly higher level than the set-point or final base idle speed.

If the engine is not de-clutched from the vehicle drive-train, the idle controller cannot satisfactorily control the engine speed down to the set-point base idle speed. The idle controller, in trying to control the engine speed down to the base idle speed, will typically react to the large error between the actual idle speed and the base idle speed by significantly reducing the engine fuelling rate. However, once the engine is finally de-clutched from the drive-train of the vehicle, with little to no fuel present in the fuel system due to the previous efforts of the idle controller, it is difficult to prevent the engine speed from dropping well below the base idle speed. This can result in significantly reduced torque backup and typically stalling of the engine.

This is generally the case if a relatively high idle entry set-point is defined in the idle speed control strategy. Whilst this problem may be partially addressed by instead adopting a relatively low idle entry set-point (ie: such that the error between the actual engine speed and the set-point or base idle speed is comparatively small when there exists no demand on the engine and it is being driven through the CVT), this then introduces other problems. In particular, where the engine is de-clutched from the vehicle drive-train and the rate of engine speed deceleration is quite high, the adoption of a low idle entry set-point will typically not give the idle controller enough of an opportunity to ensure that undershoot of the set-point engine speed and/or stalling does not occur.

Accordingly, certain applications exist where it may be beneficial to have two or more idle entry set-points such that satisfactory idle speed control can be effected by the idle controller in response to a number of different scenarios.

It is therefore an object of the present invention to provide an improved method of controlling the engine idle speed which ameliorates at least some of the above noted problems.

With this in mind, according to one aspect of the present invention, there is provided a method of controlling the idle speed of an internal combustion engine including, in response to the engine speed being below a predetermined level: determining the rate of change of the speed of the engine; selecting an idle entry set-point as a function of said rate; and initiating idle speed control of the engine on the basis of said idle entry set-point to thereby control the engine speed to a base idle speed.

Preferably, the rate of change of the speed of the engine is determined after it has been established that the engine speed is decelerating. Preferably, the rate of change of speed is determined following a reduction in the engine speed to a point below the predetermined level. Conveniently, the rate of change of engine speed is determined once it has been established that an off-idle to idle transition is occurring in the operation of the engine. In this way, it is ensured that the rate of change of engine speed is only determined when it is apparent that the engine will soon be seeking to enter an idle mode of operation.

Preferably, idle speed control of the engine speed is performed in a closed loop manner. In this regard, any suitable idle speed controller may be adapted for use with the method of the present invention.

Conveniently, during closed loop idle speed control of the engine, engine speed set-point curves may be set and the engine speed controlled to follow the set-point curves so as to progressively reduce the engine speed down to the base idle speed. The idle speed controller is typically embodied in an electronic control unit (ECU) which manages the operation of the engine. Such ECU's are well known in the field of engine management and as such will not be elaborated on further herein. Conveniently, the idle speed controller will comprise a "PID" system which serves to determine the error between the actual engine speed and the set-point speed to facilitate close loop idle speed control for the engine. The idle speed controller may however incorporate or use any other appropriate system including, for example, a "PI" or "P" system.

Conveniently, the rate of change of the engine speed may be determined as an idle entry gradient, the gradient increasing with increasing rate of change of engine speed. Hence, where a rapid deceleration in engine speed were to occur due to, for example, a short sharp burst of the vehicle throttle whilst at standstill, the gradient would typically be quite sharp (ie: large). In contrast, where a lower rate of deceleration of the engine speed were to occur, for example, where the engine is still clutched to the vehicle drive-train but there is no driver induced demand or load thereon, the gradient would be noticeably flatter (ie: small).

Preferably, at least one high idle entry set-point and one low idle entry set-point speed may be predetermined for use with the idle controller. Both the low and high idle entry set-point values will generally be greater than the base idle speed.

Conveniently, the high idle entry set-point is selected to be at a level which would avoid the engine speed undershooting the base idle speed following a rapid deceleration of the engine speed. That is, the high idle entry set-point is preferably selected such that a smooth transition from off-idle to idle may occur subsequent to a large rapid reduction in the engine speed.

Conveniently, the low idle entry set-point is selected to be at a level which would enable the engine speed to be controlled down to the base idle speed within a reasonable period following a gradual deceleration of the engine speed. More particularly, the low idle entry set-point is selected to be at or near the point at which the engine would normally be expected to be de-clutched from the vehicle drive-train. For example, if the CVT of a scooter was known to de-clutch from the engine at say 2000 rpm following a deceleration, the idle entry set-point may conveniently be selected to be at any point below 2000 rpm.

Preferably, when the idle entry gradient is above a predetermined gradient value (i.e. steeper or sharper) idle speed control is initiated on the basis of the high idle entry set-point speed. In this way, the idle controller is able to prevent undershooting of the base idle speed by the engine speed and ensure a smooth transition into idle. The relative greater difference between the base idle speed and the high idle entry set-point allows the idle controller enough opportunity to gain control of the engine speed which may be falling quite rapidly.

Preferably, when the idle entry gradient is below the predetermined gradient value (i.e. flatter) idle speed control is initiated on the basis of the low idle entry set-point speed. In this way, the large error which would otherwise occur between the actual engine speed and the base idle speed if the engine has not de-clutched from the vehicle drive-train would be avoided. Hence, when the engine finally does de-clutch, the idle controller is able to gain control of the engine speed and avoid the engine stalling or misfiring.

Conveniently, the gradients of the engine speed set-point curves vary as a function of the selected idle entry set-point value. In this way, the actual engine speed at the selected idle entry point can more closely correspond to the gradient of the speed set-point curves set by the idle controller to enable a smoother transition into idle.

Conveniently, a greater number of different idle entry set-points may be preset to provide for more precise idle speed control in response to different rates of deceleration of the engine speed.

Alternatively, the idle entry set-point may be variable over a range of set-point values. That is, the idle entry point may be calculated by a suitable algorithm or function based on the determined idle entry gradient. Hence, in this way, the most optimum idle entry point for a range of possible speeds would be able to be selected in response to the particular idle entry gradient at the time.

Conveniently, the rate of change of engine speed or the idle entry gradient are only calculated when the engine speed is between a predetermined band or range of engine speeds above the base idle speed. Preferably, the lower end of the speed range is preset to correspond with a point above the high idle entry set-point. Preferably, the speed range is set at an appropriate point above the high idle entry set-point. Conveniently, the upper end of the speed range corresponds to the predetermined value below which the rate of change of engine speed is calculated. In this way, rather than waiting for the engine speed to reduce to idle or near idle, the idle entry gradient is able to be determined when it is anticipated that the engine speed is returning to idle.

Preferably, idle speed control of the engine is not initialised until there is zero demand on the engine. That is, even though the idle entry gradient may be calculated in anticipation of the engine speed dropping to idle, the gradient is not used to determine which of the idle entry set-points is used to initiate idle speed control unless there is no load demand on the engine. Zero demand may relate to any situation where the vehicle operator has closed or released the throttle such as would be the case whilst idling prior to a launch or coasting down a hill without fuelling the engine (i.e. over-run cut conditions).

Preferably, the engine is one in which fuel is delivered directly to the combustion chamber(s) of the engine. The idle speed control method discussed above may have particular applicability to such direct injected engines due to the typical faster transient response properties thereof. That is, as fuel is delivered directly into the cylinder(s) of the engine, changes in engine speed due to increases or decreases in the engine fuelling rate are effected in comparatively shorter times.

Conveniently, fuel is delivered to the engine by way of a dual fluid fuel injection system wherein a metered quantity of fuel is propelled into the combustion chamber(s) by way of a source of compressed gas.

Such a system is disclosed for example in the Applicant's U.S. Pat. No. RE 36768, the contents of which are included herein by way of reference.

Still further, the idle speed control method is preferably effected in an engine which is controlled according to a fuel-led control system over at least part of its operating range, that is, rather than the operator demand dictating the level if airflow to the engine from which the fuelling rate is subsequently determined, the operator's demand in a fuel-led control system directly dictates the fuelling level for the engine. Accordingly, any changes to the engine operating speed and the engine idle speed are effected by way of varying the engine fuelling rate in contrast to varying the airflow to the engine. Such a fuel-led control system is discussed, for example, in the Applicant's U.S. Pat. No. 5,540,205, the contents of which are included herein by way of reference.

According to another aspect of the present invention, there is provided an ECU adapted to control the idle speed of an internal combustion engine, including in response to the engine speed being below a predetermined level:

determining the rate of change of the speed of the engine;

selecting an idle entry set-point as a function of said rate;

and initiating idle speed control of the engine on the basis of said idle entry set-point to thereby control the engine speed to a base idle speed.

It will be convenient to further describe the invention with respect to the accompanying drawings which illustrate a preferred embodiment of the method of the present invention. Other preferred embodiments of the invention are also envisaged, and consequently, the particularity of the accompanying drawings is not to be understood as superseding the generality of the preceding description of the invention.

In the drawings:

FIG. 1 is a graph showing the function of an engine idle speed control method according to the present invention; and FIG. 2 is a flow chart showing the function of the engine idle speed control method according to the present invention.

Referring initially to FIG. 1, the graph shows engine speed (Engine RPM) plotted against time for a particular engine application. Two alternative engine speed control situations are shown in the graph, with the actual engine speed (Actual RPM) being plotted against the engine speed set-point curves determined by an idle controller (RPM Set-point) for each situation. The graph is also separated into two sections equating to when the engine is operating in a running or over-run cut mode (RUNNING or ORC), and when the engine is operating at idle (IDLE).

Two predetermined idle entry set-point speeds are indicated in the graph and these are marked as High Idle Entry Set-point and Low Idle Entry Set-point. Each of these idle entry set-points is selected to be higher than the base idle speed for the engine. The idle entry set-points essentially equate to the speeds at which the idle controller may be initialised to control the engine idle speed.

As will be described in relation to FIG. 2 hereinafter, when deceleration of the engine speed occurs and the engine speed drops into a predetermined range, the uppermost point of this range corresponding to the predetermined level mentioned hereinbefore, the rate of change of the engine speed is determined. This predetermined range is indicated in FIG. 1 by points A–B. As can be seen from the graph, the predetermined speed value B is set above the High Idle Entry Set-point, however it is to be appreciated that value B could coincide with the High Idle Entry Set-point.

The predetermined speed value A is that engine speed below which determinations of the rate of change of the engine speed are made in preparation for subsequent engine idle operation. This determination is made prior to the engine speed falling below the uppermost initialisation speed or idle entry set-point for the idle controller. This rate of change of engine speed is determined as an Idle Entry Gradient as shown in FIG. 1, with the High Idle Entry Gradient indicating a relatively rapid deceleration of the engine speed, and the Low Idle Entry Gradient indicating a relatively slow deceleration of the vehicle speed. As alluded to hereinbefore, the High Idle Entry Gradient would, for example, equate to a return to idle following a short sharp burst of the throttle whilst the vehicle is stationary and the engine is unloaded. The Low Idle Entry Gradient would, for example, equate to a lesser rate of deceleration of the engine speed as may occur when the drive-train remains clutched to the engine even though there is no driver demand being applied to the engine.

Once it has been confirmed that no driver demand exists on the engine, an idle entry set-point speed is selected as a function of the rate of change of the engine speed. In particular, when the Idle Entry Gradient is above a preset value, the high idle entry set-point is selected. Otherwise, the low idle entry set-point is selected. Closed loop idle speed control of the engine is then initiated on the basis of the selected idle entry set-point speed after which the idle controller is able to effect a smooth transition into idle without any undershooting of the base idle speed which may result in engine stalling.

FIG. 1 shows that the actual engine speed at the idle entry point can be made to more closely correspond to the gradient of certain engine speed set-point curves set by the idle controller, wherein the gradient of the engine speed set-point curves may vary as a function of the selected idle entry set-point speed. The idle controller controls the fuelling rate to the engine once closed loop idle control has been initiated so that the actual engine speed generally follows the engine speed set-point curves set by the idle controller. As is shown in FIG. 1, the actual engine speed will generally follow the speed set-point curves and may overshoot above and below the speed set-point curves as the idle controller seeks to return the engine speed to the base idle speed. Regardless of whether the High or Low Idle Entry Set-point is selected, the idle controller will seek to return the engine to the same base idle speed in a relatively smooth manner.

FIG. 2 shows the various steps which would be followed by a control method according to the present invention. The control method or strategy would typically be recorded in and carried out by an ECU adapted to manage the operation of the engine. Subsequent to normal operation of the engine as indicated at step 10, the ECU initially makes a determination of whether the engine speed has fallen within a predetermined band or range above the uppermost initialisation speed or idle entry set-point (i.e. range A–B). This occurs at step 12 and typically results from a deceleration of the engine speed in response to the operator releasing or closing the throttle of the engine. With the engine speed still above the uppermost idle entry set-point value but within the predetermined band of engine speeds, the ECU then proceeds to step 14.

At step 14, with the engine speed still above the uppermost idle controller initialisation speed, the rate of change of the engine speed is determined. This is calculated as an Idle Entry Gradient. If at step 16 the ECU determines that there exists zero demand on the engine, the Idle Entry Gradient can subsequently be used to initiate idle speed control of the engine. A zero demand situation will typically exist where the throttle is completely closed. If however there is still some demand on the engine, indicating that the operator does not wish to enter idle, then the engine maintains its normal operation with the ECU subsequently re-checking whether operation at idle is anticipated.

Once it has been determined that idle operation is impending, the Idle Entry Gradient is compared against a predetermined gradient value at step 18. This is done to establish whether the Idle Entry Gradient is comparatively high or low. At step 20, and on the basis of whether there exists a High or Low Idle Entry Gradient, the ECU then selects an appropriate Idle Entry Set-point. This Idle Entry Set-point is selected so as to enable the idle controller to satisfactorily control the engine idle speed without allowing the engine to stall and to promote a smooth transition into idle.

The ECU then effects closed loop idle control at steps 22 and 24 wherein the engine speed is controlled by the idle controller. The selected Idle Entry Set-point value determines the engine speed at which the idle controller is initialised to control the engine speed. The fuelling rate to the engine is then controlled by the idle controller to return and maintain the engine speed at the base idle speed. That is, the idle controller operates to reduce the engine speed progressively downwards from the Idle Entry Set-point value to the base idle speed, typically by gradually reducing the fuelling rate to the engine. This closed loop idle speed control continues until the ECU determines that a level of driver demand has been applied to the engine (ie: operator desires to move off idle) upon which normal control of the engine resumes. As alluded to hereinbefore, the idle controller will typically apply certain engine speed set-point curves to smoothly reduce the engine speed from a particular idle entry set-point value to the base idle speed. That is, once an idle entry set-point has been selected, the engine speed is progressively reduced down to the base idle speed according to a predetermined engine speed set-point curve implemented by the idle controller. Typically, the speed set-point curves will be selected to have a gradually decreasing gradient to promote a smooth transition from off-idle to idle engine operation.

The idle speed control method as described above enables the idle speed controller to satisfactorily deal with the significantly different engine speed deceleration rates that may be experienced in an engine when returning to or entering idle. Because the actual engine speed more closely corresponds to the engine speed set-point curves set by the idle controller, there is less likelihood of the engine stalling as the idle controller is not required to compensate for any large differences between the actual engine speed and the set-point base idle speed.

The idle speed control method according to the present invention is particularly well suited to fuel-led direct injected engines due to the comparatively faster engine speed transients experienced thereby. For similar reasons, the method is also particularly applicable to engines operating according to a two-stroke and, in particular, low inertia engines. The ability to deal with a variety of deceleration rates when entering or returning to idle enables a reliable, smooth transition to be effected.

The method according to the present invention has in the main been described with reference to engines which use a CVT. It is however to be appreciated that the invention is equally applicable to other engine applications, whether of the four or two stroke type, and whether employing dual fluid or single fluid fuel injection systems.

Modifications and variations as would be deemed obvious to the person skilled in the art are included within the ambit of the present invention as defined in the appended claims. For example, in certain engine applications, particularly those where the vehicle or craft speed is directly related to the engine speed, the rate of change of the road or vehicle/craft speed could be used as a determining factor in selecting different idle entry set-point values.

What is claimed is:

1. A method of controlling the idle speed of an internal combustion engine including, in response to the engine speed being below a predetermined level:
    determining the rate of change of the speed of the engine;
    selecting an idle entry set-point as a function of said rate; and
    initiating idle speed control of the engine on the basis of said idle entry set-point to thereby control the engine speed to a base idle speed.

2. A method according to claim 1, wherein the rate of change of the speed of the engine is determined after it has been established that the engine speed is decelerating.

3. A method according to claim 1, wherein the rate of change of the speed of the engine is determined following a reduction in the engine speed to a point below the predetermined level.

4. A method according to claim 1, wherein the rate of change of engine speed is determined once it has been established that an off-idle to idle transition is occurring in the operation of the engine.

5. A method according to claim 1, wherein idle speed control of the engine speed is performed in a closed loop manner using an idle speed controller.

6. A method according to claim 5, wherein the idle speed controller comprises a PID system for determining the error between the actual engine speed and the set-point base idle speed to facilitate closed loop idle speed control for the engine.

7. A method according to claim 1, wherein the rate of change of the engine speed is determined as a idle entry gradient, the gradient increasing with increasing rate of change of engine speed.

8. A method according to claim 1, wherein at least one high idle entry set-point and at least one low idle entry set-point speed are predetermined for use with the idle controller.

9. A method according to claim 8, wherein the high idle entry set-point is selected to be at a level which would avoid the engine speed undershooting the base idle speed following a deceleration of the engine speed.

10. A method according to claim 8, wherein the low idle entry set-point is selected to be or near the point at which the engine would normally be expected to be de-clutched from the drive-train of a vehicle to which the engine is coupled.

11. A method according to claim 7, wherein when the idle entry gradient is above a predetermined gradient value, idle speed control is initiated on the basis of the high idle entry set-point speed.

12. A method according to claim 7, wherein when the idle entry gradient is below the predetermined gradient value, idle speed control is initiated on the basis of the low idle entry set-point speed.

13. A method according to claim 1, wherein during idle speed control of the engine, the engine speed may be controlled to follow predetermined engine speed set-point curves down to the base idle speed.

14. A method according to claim 13, wherein the gradients of the engine speed set-point curves vary as a function of the selected idle entry set-point value.

15. A method according to claim 8, wherein more than two different idle entry set-points are preset to provide for more precise idle speed control in response to different rates of deceleration of the engine speed.

16. A method according to claim 15, wherein the idle entry set-point is variable over a range of set-point values.

17. A method accord to claim 1, wherein the rate of change of engine speed is only calculated when the engine speed is between a predetermined range of engine speeds above the base idle speed.

18. A method according to claim 17, wherein the lower end of the speed range is preset to correspond with a point above the high idle entry set-point.

19. A method according to claim 17, wherein the speed range is set at an appropriate point above the high idle entry set-point.

20. A method according to claim 17, wherein the upper end of the speed range corresponds to the predetermined level below which the rate of change of engine speed is calculated.

21. A method according to claim 1, wherein idle speed control of the engine is not initialised until there is zero demand on the engine.

22. A method according to claim 1, wherein the engine includes a direct fuel injection system, and the idle speed is controlled by varying the fuelling rate to the engine.

23. A method according to claim 1, wherein the engine includes a dual fluid fuel injection system.

24. A method according to claim 1, wherein the engine is controlled according to a fuel-led control system over at least part of its operating range.

25. An ECU adapted to control the idle speed of an internal combustion engine, including in response to the engine speed being below a predetermined level:
   determining the rate of change of the speed of the engine;
   selecting an idle entry set-point as a function of said rate; and
   initiating idle speed control of the engine on the basis of said idle entry set-point to thereby control the engine speed to a base idle speed.

26. An ECU according to claim 25, wherein the rate of change of the speed of the engine is determined after it has been established that the engine speed is decelerating.

27. An ECU according to claim 25, wherein the rate of change of the speed of the engine is determined following a reduction in the engine speed to a point below the predetermined level.

28. An ECU according to claim 25, wherein idle speed control of the engine speed is performed in a closed loop manner using an idle speed controller.

29. An ECU according to claim 25, wherein the rate of change of the engine speed is determined as an idle entry gradient, the gradient increasing with increasing rate of change of engine speed.

30. An ECU according to claim 25, wherein at least one high idle entry set-point and at least one low idle entry set-point speed are predetermined for use with the idle controller.

31. An ECU according to claim 25, wherein the rate of change of engine speed is only calculated when the engine speed is between a predetermined range of engine speeds above the base idle speed.

* * * * *